United States Patent [19]
Zuvela

[11] 3,888,201
[45] June 10, 1975

[54] AUTO-PILOT
[75] Inventor: Bernard R. Zuvela, Fountain Valley, Calif.
[73] Assignee: Scientific Drilling Controls, Newport Beach, Calif.
[22] Filed: Oct. 29, 1973
[21] Appl. No.: 410,713

[52] U.S. Cl............. 114/144 R; 244/77 R; 318/588; 318/591; 318/647; 318/661
[51] Int. Cl.............................................. B63h 25/04
[58] Field of Search....... 114/144 R; 180/79.1, 79.2; 235/150.2; 73/178 R, 181; 244/50, 77 R, 77 B, 77 E, 77 SE, 77 V; 318/588, 647, 653, 591, 661; 33/316, 319, 361; 340/197

[56] References Cited
UNITED STATES PATENTS

| | | | |
|---|---|---|---|
| 2,589,834 | 3/1952 | MacCallum | 244/77 E |
| 2,771,258 | 11/1956 | Johnson | 244/77 E |
| 2,800,723 | 7/1957 | Wollan et al. | 318/647 X |
| 2,834,562 | 5/1958 | Jude et al. | 244/77 E |
| 2,969,208 | 1/1961 | Dove | 244/77 B |
| 3,167,698 | 1/1965 | Gray et al. | 318/647 |
| 3,493,829 | 2/1970 | Cramwinckel | 318/653 X |
| 3,685,352 | 8/1972 | Pounder et al. | 73/178 R |

*Primary Examiner*—Trygve M. Blix
*Assistant Examiner*—Stephen G. Kunin
*Attorney, Agent, or Firm*—William P. Green

[57] ABSTRACT

An Auto-Pilot for steering a craft automatically in water or air, and including a flux gate arrangement mounted to the craft in a predetermined horizontal directional orientation, and a resolver having a first section with coils energized by signals from the flux gate to produce a magnetic field dependent upon the heading of the craft relative to the earth's magnetic field, and a second section having a coil which produces an output signal representing the position of that coil relative to the field produced by the first mentioned coils. One of the resolver sections can be rotated relative to the other section to any selected setting representing a desired course which the craft is to follow, and the output of the resolver is then utilized to automatically steer the craft toward that course. In a second mode of operation the output from the resolver may be disconnected from the steering mechanism and be utilized in a non-steering manner to automatically return the rotatable section of the resolver to a position corresponding to the field which is generated in the resolver by the flux gate, and thereby cause the rotatable section of the resolver to follow the earth's magnetic field and function as a compass repeater.

11 Claims, 7 Drawing Figures

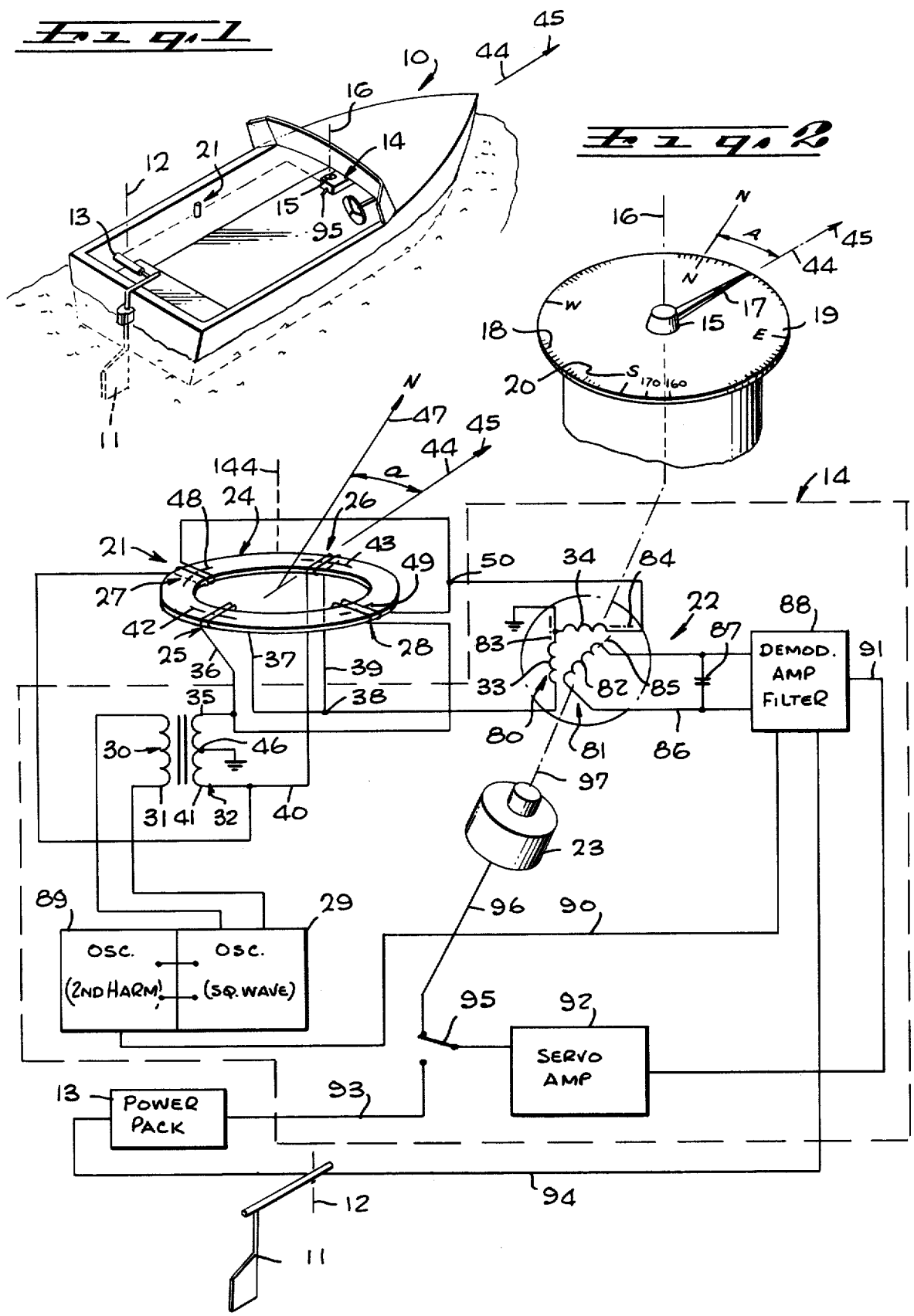

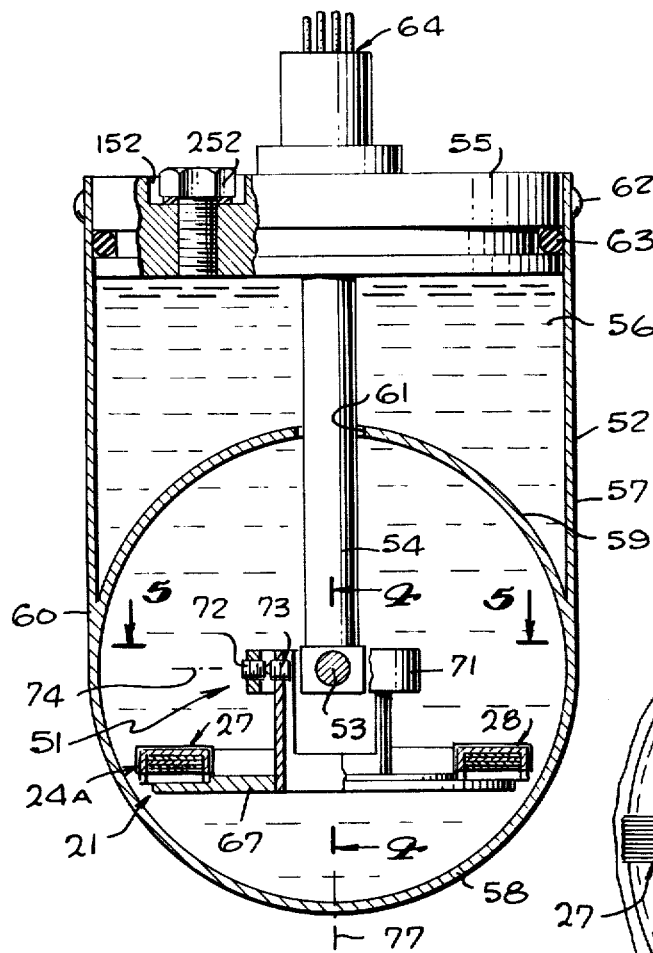
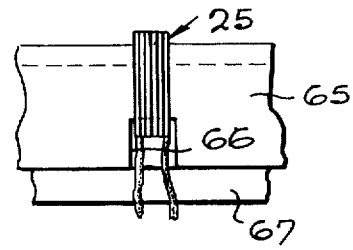
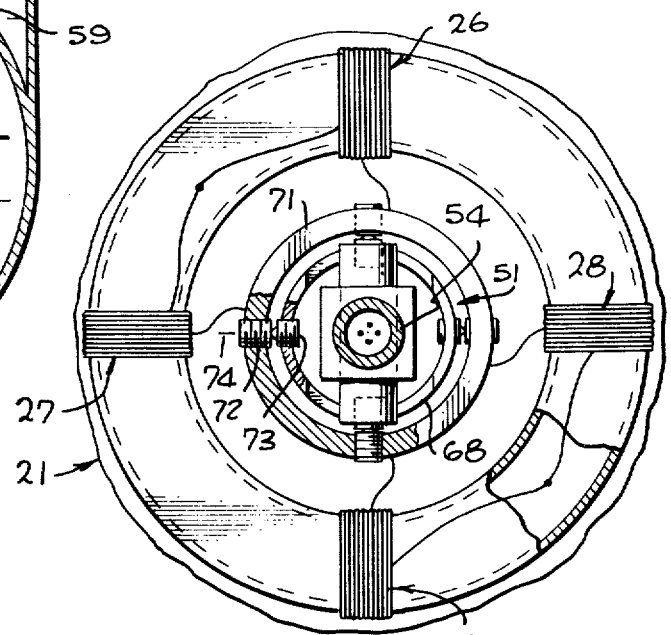
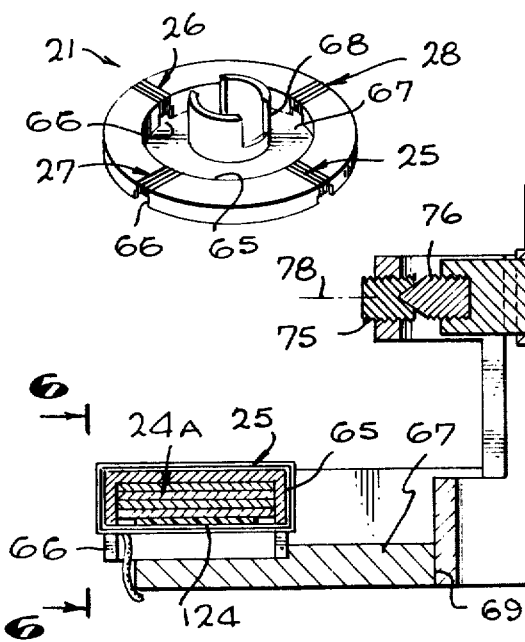

AUTO-PILOT

BACKGROUND OF THE INVENTION

This invention relates to improved auto-pilots for automatically steering a boat in a body of water, or an aircraft in air.

Various types of auto-pilots for boats and aircraft have been devised in the past, but all of those of which I am aware have been either unreliable in operation or too complex and expensive to be practically usable on most craft. One widely used conventional type of auto-pilot employs a floating compass card arrangement having apertures coacting with photoelectric cells in a manner causing alteration of the output of the cells in response to rightward or leftward deviations of the craft from a desired course. Unfortunately, the angle of deviation within which this type of auto-pilot can function is fairly small, and if the craft for any reason veers off course to an angle beyond that range the apparatus is no longer effective to cause a course correction and bring the craft back to a proper heading. Other previously proposed types of auto-pilots have employed coil arrangements magnetically responsive to the earth's magnetic field for controlling the steering of the craft, but the circuitry of the devices of this type which applicant has seen proposed appears unduly involved and complex, and less precise in operation than would be desired.

SUMMARY OF THE INVENTION

Auto-pilots constructed in accordance with the present invention utilize a flux-gate type of direction sensing unit delivering a signal representing direction to a resolver, one section of which can be preset to a condition representing a particular course along which the craft is to be steered by the auto-pilot apparatus. When set to a selected course, the resolver produces an output signal which is dependent upon the difference if any between the selected course to which the resolver is set and the actual heading of the craft as determined by the flux-gate means. That signal is then utilized to control a course correction, as by actuation of a rudder of the craft, to bring the craft to the heading set on the resolver.

The flux-gate unit includes coil means mounted to the craft in a fixed horizontal directional orientation with respect thereto, that is, with a particular predetermined portion of the coil unit always directed toward the bow or forward portion of the craft. These coil means, however, are preferably supported as by gimbals for maintenance in a predetermined horizontal condition regardless of any pitch or roll of the craft. The flux-gate coils may be energized by an alternating current, and be associated with a magnetic core or cores which become saturated on each cycle of the alternating current, before the potential of the alternating current reaches its peak value. Two such coils connected in opposition to one another produce a second harmonic output representative of the value of the earth's magnetic field component aligned with the axis of the coils. Preferably, two such pairs of such opposed coils are provided, having the axis of one pair disposed at an angle (desirably 90°) with respect to the axis of the other pair, to produce signals representative of two relatively angularly disposed horizontal components of the earth's field extending in those two directions respectively.

The resolver may be of conventional construction, and is desirably of the inductive type, having a first section with a coil structure adapted to receive signals from the flux-gate and produce in response thereto a magnetic field whose direction is determined by the deviation of the craft heading from magnetic north. The coil structure of this first section of the resolver may include two coils disposed at an angle to one another, preferably 90° with respect to one another, in correspondence with the angularity of the previously mentioned two sets of flux-gate coils, to produce in the resolver a magnetic field which is the resultant of two sensed components of the earth's magnetic field. The resolver then functions to produce an output dependent upon or representative of the difference between the direction of this resultant field in the resolver and the direction in which a coacting coil carried by the second section of the resolver extends. That signal is then the one employed for controlling the steering of the craft, to bring the discussed resultant field of the first section and the coil of the second section into coincidence with one another, and thereby cause the craft to continuously follow the desired course determined by the setting to which one of the two sections is manually turned relative to the other section.

Certain additional features of the invention relate to a unique manner of converting between the above discussed automatic steering condition of the apparatus and a manually steered condition in which the movable section of the resolver automatically follows the heading of the craft, to indicate the direction of that heading. In this latter condition, the output signal from the resolver is employed to drive a motor which turns the movable section of the resolver to a position in which the field produced by the flux-gate responsive input section of the resolver and the coil of the output section are in alignment. An operator may then steer the craft manually in this second condition of the auto-pilot until a predetermined heading of the craft is attained, usually by visually sighting an object toward which it is desired to travel, following which the apparatus is converted to the auto-pilot condition to automatically maintain this visually set course.

BRIEF DESCRIPTION OF THE DRAWINGS

The above and other features and objects of the invention will be better understood from the following detailed description of the typical embodiment illustrated in the accompanying drawings, in which:

FIG. 1 is a perspective representation of a boat carrying auto-pilot equipment constructed in accordance with the invention;

FIG. 2 is a diagrammatic representation of the circuitry of the present auto-pilot apparatus;

FIG. 3 is a vertical section through the earth's field responsive flux-gate unit of the auto-pilot;

FIG. 4 is an enlarged fragmentary vertical transverse section taken on line 4—4 of FIG. 3;

FIG. 5 is an enlarged horizontal section taken on line 5—5 of FIG. 3;

FIG. 6 is an enlarged fragmentary side view taken on line 6—6 of FIG. 4; and

FIG. 7 is a fragmentary perspective showing of the flux gate coil assembly of the device.

DESCRIPTION OF THE PREFERRED EMBODIMENT

Referring first to FIG. 1, I have represented at 10 a boat which is steered by a conventional rudder 11 actuated in opposite directions about a vertical axis 12 by a diagrammatically represented power actuated operating unit 13, which may consist of an appropriate rotary motor operatively connected to the rudder, or a fluid actuated piston and cylinder mechanism, or any other satisfactory drive unit. The unit 13 is controlled in part by a flux gate unit 21 responsive to the direction of the earth's magnetic field, and in part by circuitry located within a control box 14. This box 14 is mounted in fixed position in the boat, and carries a control switch 95 and knob 15 both accessible to an operator in the boat. The knob 15 is adapted to be turned about a desirably vertical axis 16 to positions representing any desired course along which the boat is to be steered by the auto-pilot. As seen in FIG. 2, the knob 15 may carry a pointer 17 coacting with directional markings 18 on a compass card 19 carried stationarily by box 14. The markings 18 may indicate the different course directions in degrees from 0° to 360°, and may further include markings 20 indicating the magnetic north, south, east and west directions.

The circuitry of FIG. 2 includes a resolver 22 responsive to output signals from flux gate 21, and to the rotary positioning of course selecting knob 15, a motor 23 for driving a knob 15 and its pointer 17 in the nonautomatic steering condition of the apparatus, and certain additional circuit elements to be discussed hereinbelow. Unit 21 may take any of various forms, but preferably includes an annular horizontal core 24 of paramagnetic material having a first pair of diametrically opposite coils 25 and 26 disposed thereabout, and a second pair of diametrically opposite coils 27 and 28 disposed about the core but offset 90° about a vertical axis 144 from coils 25 and 26. All of these coils are energized by a preferably square wave oscillator 29 (though a sine wave or other wave shape can be used if desired), typically at a frequency of 1 kilohertz, through a transformer 30 whose primary coil 31 is connected to the oscillator and whose secondary coil 32 is connected to the coils in the circuit illustrated in FIG. 2. More particularly, the two diametrically opposite coils of each pair may be connected to secondary coil 32 of the transformer in a relation producing an output signal in a corresponding coil 33 or 34 of resolver 22 in response to the sensing of a component of the earth's magnetic field by the corresponding pair of flux gate coils. For example, following the circuit through the coils 25 and 26, commencing at the upper end 35 of transformer coil 32, the circuit from this end of the transformer secondary extends through a line 36 to coil 25, then through a line 37 to a junction point 38, from which a line 39 conducts current to coil 26 in series with coil 25, and then back through a return line 40 to the lower end 41 of transformer secondary 32. Coils 25 and 26 are so mounted on the core that their axes 42 and 43 are directly parallel to one another and both horizontal. However, it will be apparent from FIG. 2 that the two coils 25 and 26, though connected in series aiding relation to both produce flux in the same rotational direction, i.e., clockwise or counterclockwise, may be considered as wound oppositely with respect to the earth's magnetic field because they are on opposite sides of the core, so that particular instantaneous current passing through the two coils in series produces magnetic flux extending in a first direction along axis 42 and in the opposite direction along axis 43. Thus, any component of the earth's magnetic field extending in the direction of the axes 42 or 43 will add to the magnetic field produced by current passing through one of the coils 25 or 26 and oppose the field produced by the same current flowing through the other of the two coils. The core 24 and coils 25 through 28 are so mounted relative to the vessel that the horizontal axes 42 and 43 of coils 25 and 26 are always disposed directly perpendicular to the horizontal bow to stern axis 44 of the boat. The arrowhead 45 formed on this axis in FIG. 2 represents the horizontal direction of travel of the boat in the water.

The previously mentioned junction point 38 between the two coils 25 and 26 is also connected to coil 33 of the resolver 22, with the second end of that coil being connected back through ground or otherwise to a center tap 46 of transformer coil 32.

Core 24 is so designed and selected as to be capable of conducting only a relatively small amount of magnetic flux through the core, and specifically is so designed that the portion of the core within each coil becomes saturated during each half cycle of the alternating current, and more particularly becomes saturated at a time well before the AC potential reverses polarity. If the boat is turned to a position in which the two axes 42 and 43 of cores 25 and 26 do not extend in a directly east to west direction, that is, do not extend directly transversely of the horizontal component of the earth's field, then a component of the earth's field will add to the flux produced by one of the coils 25 or 26, and detract from the flux produced by the other coil. As a result, the portion of the core located within one of the coils will reach saturation earlier than the portion of the core located within the other of the two coils, and there will be a short interval during which an unbalanced condition exists because of saturation of the core within one coil but not the other. This unbalanced condition produces an output signal at point 38 in FIG. 2, and therefore produces a voltage signal across coil 33 of the resolver. Such signals occur in coil 33 at a frequency which is the second harmonic of the frequency of oscillator 29 (i.e., 2 kilohertz if oscillator 29 functions at a 1 kilohertz frequency.) The value of this second harmonic frequency signal varies in accordance with the deviation of the actual vessel heading 45 from the magnetic north-south direction 47.

The second pair of diametrically opposite coils 27 and 28 may be identical with coils 25 and 26 but offset 90° with respect thereto, so that their mutually parallel axes 48 and 49 extend horizontal and perpendicular to axes 42 and 43, and also directly parallel to the main front to rear axis 44 of the boat. Coils 27 and 28 are connected to transformer 30 in a circuit corresponding to that previously discussed in connection with coils 27 and 28, except that the signal takeoff point 50 from coils 27 and 28 is connected to the second of the coils 34 of the resolver, to produce a second harmonic signal therein varying in correspondence with the deviation of axes 48 and 49 from a position of parallelism with respect to the horizontal component 47 of the earth's magnetic field.

The flux gate coils 25 through 28 and their core 24 of FIG. 2 are desirably so mounted that the core and the various axes 42, 43, 48 and 49 remain at all times in a horizontal plane even though the vessel may pitch or roll to a non-horizontal position. FIG. 3 shows a particular presently preferred way of constructing the flux gate unit and mounting it for maintenance in horizontal position by a gimbal arrangement 51. This unit may include a rigid housing 52 which is appropriately mounted in rigidly fixed position relative to the hull of the boat and desirably at a location remote from control box 14. The flux gate coil and core assembly 21 may be mounted in the lower portion of housing 52 by the gimbal assembly 51, which suspends assembly 21 for universal movement about a center 53 and from a supporting post 54 projecting downwardly from the top wall 55 of the housing. A body of damping liquid 56 may be contained within housing 52, to resist movement of flux gate assembly 21 sufficiently to prevent excessive vibration or other unrestricted movement thereof. Housing 52 and all parts carried thereby except for core 24 should be formed of a non-magnetic material, such as aluminum.

Housing 52 may have a vertical tubular side wall 57 terminating downwardly in a hemispherical inverted dome portion 58, with an upwardly convex dome element 59 secured in the housing to enclose with bottom wall 58 a spherical body of liquid tending by inertia effect to resist unwanted movements of this body of liquid and assembly 21. Dome 59 may be secured peripherally at 60 to housing 52, and contain a top opening 61 somewhat larger than the external diameter of cylindrical vertical post 54 to allow communication between the liquid above dome 59 and the liquid therebeneath. Provisions are made for filling liquid into the housing through a part 152, which may be closed by a fluid tight seal screw 252 or other closure. The liquid level is adjusted to allow for liquid expansion or contraction under varying temperature conditions.

Top wall 55 of the housing is secured in position by screws 62, and is annularly sealed with respect to side wall 57 of the housing by an O-ring 63, with a similar seal provided between top wall 55 and post 54. The electrical leads to the flux gate assembly 21 extend into the upper end of post 54 at 64, and extend downwardly through the post to the coils of assembly 21.

The easily saturable core 24 of assembly 21 may consist of one or more thin horizontal rings of paramagnetic material, such as mumetal. In one typical form of the invention, four such rings or laminations 24A were utilized, superimposed one above the other, each having an internal diameter of 1 ⅛th inches, an external diameter of 1 ½ inches, and a thickness of 4 mils, and with an electrically insulative ring 124 of plastic material therebeneath. In this form of the invention, each of the coils 25, 26, 27 and 28 included 50 turns of fb 36 gauge insulated wire. The core ring or rings may be contained within an annular rigid enclosing member 65 formed of a nonmagnetic material, such as aluminum, and having the inverted U-shaped cross sectional configuration illustrated in FIG. 4, with notches 66 being cut in the lower edges of element 65 at the locations of the coils to receive and locate the coils relative to the core. This inverted core and assembly may then be mounted on the upper surface of an annular horizontal nonmagnetic bottom wall 67, being appropriately secured thereto by a suitable adhesive or other means, and with the inner edge of wall 67 being secured to the lower edge of a vertical tubular element 68 and 69.

This element 68 is then employed for connection near its upper edge 70 to the gimbal assembly 51. In lieu of this discussed sectional formation of the structure 65-67-68 for carrying the coils and magnetic core, it is contemplated that an appropriately shaped one-piece element may carry these parts, such as a single member formed of resinous plastic material, molded to provide portions on which the coils may be wound, and to carry the core and gimbal pins 73.

The gimbal assembly may include a ring 71 having two diametrically opposed bearings 72 which receive two pins 73 projecting in opposite directions from the upper edge portion of tube 68, to mount that tube for pivotal movement about a horizontal axis 74 relative to the ring. Offset 90° from bearing elements 72, ring 71 carries two additional bearing elements 75 (FIG. 4) which receive two pins 76 projecting in diametrically opposite directions from post 54, perpendicular to the vertical axis 77 of that post, to mount ring 71 for pivotal movement about an axis 78 relative to the post. Thus, the gimbal arrangement 51 mounts the flux gate assembly for movement relative to post 54 about two mutually perpendicular axes 74 and 78. The entire assembly is of course so balanced gravitationally as to maintain assembly 21 in horizontal plane 79 by gravity in all positions of the boat hull.

Returning to FIG. 2, resolver 22 may as previously indicated be a conventional resolver of known inductive type, such as for example those described on pages 162 to 165 of the text *Electromechanical Components for Servomechanisms*, Davis and Ledgerwood, published by McGraw-Hill Book Company, Inc. The resolver has a first section 80 carrying the two input coils 33 and 34, with appropriate magnetic material associated therewith, and a second section 81 carrying an additional coil 82. One of the sections is mounted for rotation relative to the other by turning of knob 15. In the arrangement illustrated in FIG. 2, it is assumed that the section 81 is the rotary section or armature, which turns about axis 16 relative to stator section 80. The two input coils 33 and 34 have their axes 83 and 84 disposed perpendicular to one another, in a relation producing magnetic fields offset 90° with respect to one another about axis 16. The previously discussed signals delivered to these coils from the flux gate coils through points 38 and 50, therefore produce magnetic fields in the magnetic stator material associated with the coils 33 and 34, which represent two components of the earth's magnetic field offset 90° with respect to one another, and which together produce a resultant magnetic field in the resolver, and in the vicinity of coil 82, representing the angle *a* between the magnetic north-south direction and the front to rear axis 44 of the boat. The axis 85 of the rotary coil 82 of the resolver may extend through the intersect axis 16 perpendicularly. When axis 85 of coil 82 is directly aligned with or parallel to the resultant field produced by the two input coils 33 and 34, the resolver produces no output in lines 86. Any deviation from this position of alignment results in the formation of a second harmonic signal in lines 86 representing such deviation. A capacitor 87 connected across lines 86 is matched to the resolver and tuned to the second harmonic frequency, to pass primarily that frequency to a synchronous demodulator and amplifier and filter unit 88. A second harmonic oscillator 89 synchronizes and controls primary oscillator 29, and feeds a second harmonic demodulating signal through line 90 to demodulator 88, so that the latter produces in its output line 91 a direct current signal, whose voltage is proportional to and represents the sine of the difference between angle *a* and angle A which is the setting of pointer 17 with respect to magnetic north. Thus, so long as the resultant magnetic field produced by coils 33 and 34 in the resolver coincides with the setting of coil 82 and pointer 17, the signal in line 91 is 0. Any deviation from such coincidence produces an output DC signal proportional to the sine of the difference between the angles *a* and A.

This signal in line 91 is fed to a servoamplifier 92, which generates a control signal in line 93 proportional to the signal in line 91 and acting to actuate powered unit 13 to move the rudder in a proper direction for steering the boat toward a direction in which the resultant field produced by coils 33 and 34 will be brought into coincidence with the axis of coil 82, to thus produce a null condition. A feedback signal from rudder 11 may be fed through a line 94 back to the demodulator 88, and be utilized to control the extent to which the rudder is turned under different operating conditions in a manner preventing oversteering.

A selector switch 95 may be connected into the line between servoamplifier 92 and powered rudder actuating unit 13, to connect the output of the servoamplifier selectively either to the automatic steering line 93, as discussed, or a line 96 leading to the previously mentioned motor 23, which is connected by an appropriate drive represented at 97 to the rotary armature 81 of the resolver. When switch 95 is in a position to connect the output of the servoamplifier to the motor, the signal from line 91 actuates motor 23 to positively drive rotor 81 of the resolver toward a position in which coil 82 is in alignment with the resultant field produced by the two input coils 33 and 34 of the resolver. Thus, in this condition of the apparatus, the rotor of the resolver and pointer 17 are turned toward a null position in which coil 82 is aligned with the resultant field of coils 33 and 34, in which position the signal in line 91 reduces to 0 and the motor is de-energized. Pointer 17 in this way becomes a repeater compass acting to indicate directly the heading of the boat.

To recapitulate briefly the manner of use of the illustrated apparatus, assume first of all that it is desired to set the auto-pilot to automatically steer the boat on a predetermined compass course. This result can be achieved by merely turning the movable contact of switch 95 to its lower position in which the output of servoamplifier 92 is delivered through line 93 to rudder actuating unit 13, and then turning knob 15 and its pointer 17 to a position in which the pointer is aligned with one of the markings 18 representing the desired compass course. The flux gate coils 25 and 26 then produce together a second harmonic output in resolver coil 33 representing the horizontal component of the earth's magnetic field extending parallel to axes 42 and 43, while coils 27 and 28 produce in resolver coil 34 whatever horizontal component there is of the earth's magnetic field extending along axes 48 and 49. The resultant of these two fields in the resolver coacts with coil 82 to produce an output in lines 86 which acts through units 88, 92 and 13 to actuate the rudder in a direction moving the bow of the boat toward the desired heading set by pointer 17. Any deviation from the proper heading results in corresponding actuation of the rudder to return the boat to the proper course, in which the resolver is at a null setting and produces no output.

If the operator desires to set the auto-pilot to direct the boat toward a particular object observed visually on the horizon, switch 95 is actuated to its upper setting in which the signal in line 91 acts through motor 23 to cause pointer 17 to follow and indicate the boat's actual heading. When a proper heading is attained, as determined visually, the operator actuates switch 95 to its auto-pilot condition, to maintain that heading automatically.

While a certain specific embodiment of the present invention has been disclosed as typical, the invention is of course not limited to this particular form, but rather is applicable broadly to all such variations as fall within the scope of the appended claims.

I claim:

1. An autopilot system for automatically controlling the steering of a craft, comprising flux gate means adapted to be mounted on the craft in a predetermined orientation with respect to the heading of the craft and fixed against rotation relative to the craft about a vertical axis, means for energizing said flux gate means in a relation producing output signals dependent upon the directional orientation of said flux gate means relative to the earth's magnetic field and thereby representing the heading of the craft, a resolver including a first section and a second section mounted for rotation relative to said first section to positions representing different desired course directions, one of said sections of the resolver being energized by said signals from said flux gate means, and the other of said sections being operable to produce signals for controlling the steering of said craft and representing the difference between a desired craft course to which said other section is set and the actual craft course as represented by said first mentioned signals; said energizing means including a source of alternating current; said flux gate means including two mutually perpendicular pairs of flux gate coils responsive to mutually perpendicular horizontal components of the earth's magnetic field, and core means associated with said coils and adapted to be saturated with flux prior to attainment of maximum potential on each cycle of the alternating current, the coils of each pair being connected in series with one another but oppositely so that the two pairs produce output signals which are second harmonics of the energizing alternating current and represent respectively said two horizontal components of the earth's magnetic field; said one section of the resolver including two mutually perpendicular coils energized by said two second harmonic signals respectively from the flux gate coils and acting to produce a resultant magnetic field in the resolver representing the angularity of the earth's magnetic field with respect to the craft; said other section of the resolver having an additional coil which is aligned with said resultant field when the heading of the craft corresponds with the setting of said second section; a rudder for steering the craft; power actuated means for driving the rudder; a motor for driving said second section of the resolver rotatively; selector switch means for selectively controlling by and in accordance with said second mentioned signals either said power actuated means to automatically steer the craft to a position in which said additional coil is aligned with said resultant field, or said motor to drive said second section of the resolver to a position in which said additional coil is aligned with said resultant field; a demodulator responsive to a second harmonic component of said second mentioned signals from said additional coil of the resolver to produce a DC voltage varying in accordance with the angularity between said additional coil and said resultant field; and an amplifier energized by said DC voltage and connected to said selector switch means.

2. An autopilot system for steering a craft, comprising:
- a first pair of flux gate coils responsive to the earth's magnetic field and connected in series to have two end leads at opposite ends of the coil series and a common lead between the coils;
- a second pair of flux gate coils connected in series and also having two end leads and a common lead between the coils;
- core means of magnetic material associated with said four coils respectively;
- said four coils and said core means being adapted to be mounted on the craft in a predetermined orientation with respect to the heading of the craft, and to be fixed against rotation relative to the craft about a vertical axis;
- the two coils of said first pair having axes extending in a common direction but being wound reversely to respond oppositely to a first component of the earth's magnetic field;
- the two coils of said second pair having axes extending in a second common direction perpendicular to said direction of the first pair, and being wound reversely to respond oppositely to a second component of the earth's field perpendicular to said first component;
- there being connected to each of said pairs of coils an alternating current power source, which may be the same source for both pairs, and which has two opposite end taps connected to said end leads respectively of the pair of coils and an intermediate tap between said end taps;
- said alternating current being of a value to saturate said coils with flux on individual cycles and before reversal of polarity of the alternating current, so that a first signal representing said first component of the earth's field is produced between said common lead of said first pair of coils and said intermediate tap of the associated power source, and a second signal representing said second component of the earth's filed is produced between said common lead of the second pair of coils and said intermediate tap of its power source;
- a resolver having a first section and a second section mounted for rotation relative to said first section to positions representing different desired course directions;
- one of said sections of the resolver having two coils offset ninety degrees electrically with respect to one another;
- means for energizing said two coils of the resolver in accordance with the intensities of said first and second signals respectively to produce a resultant magnetic field in said one section of the resolver representing the earth's field;
- the other section of said resolver having coil means in which a third signal is induced representing any deviation of the directional orientation of said coil means from the direction of said resultant field produced by said coils of the first resolver section; and
- power operated steering means responsive to said third signal to turn the craft toward a position bringing said coil means and said resultant field into alignment, and thereby bringing the actual heading of the craft into correspondence with the setting of the second section of the resolver relative to said first section.

3. An autopilot system as recited in claim 2, in which said alternating current power source connected to each pair of coils includes a transformer having a primary energized by alternating current and a secondary coil having said end taps at its opposite ends and having said intermediate tap connected to an intermediate portion of said secondary coil.

4. An autopilot system as recited in claim 2, in which the two coils of each of said pairs of coils are electrically identical though wound reversely, and said power source associated with each pair of coils includes a transformer having a primary coil energized by alternating current and a secondary coil having said end taps at its opposite ends and having said intermediate tap connected to the center of said secondary coil.

5. An autopilot system as recited in claim 2, in which each of said two coils of said one resolver section is connected at a first end to said common lead of a corresponding one of said pairs of flux gate coils, and at a second end of said intermediate tap of the power source.

6. An autopilot system as recited in claim 2, including means mounting said flux gate coils and said core means for movement relative to the craft in a manner to be maintained by gravity in essentially horizontal position, while retaining said flux gate coils and core means in said predetermined orientation with respect to the heading of the craft, and against rotation relative to the craft about a vertical axis.

7. An autopilot system as recited in claim 2, in which said mounting means are gimbal mounting means movably supporting said flux gate coils and core means.

8. An autopilot system as recited in claim 2, including a motor for driving said second section of the resolver rotatably to different settings relative to said first section, and means operable in a predetermined non-autopilot condition of said system to energize said motor under the control of said third signal to drive said second section of the resolver to a setting corresponding to the actual heading of the craft.

9. An autopilot system as recited in claim 2, including a motor for driving said second section of the resolver rotatably to different settings, and means operable in a predetermined non-autopilot condition of said system to energize said motor under the control of said third signal to drive said second section of the resolver to a setting corresponding to the actual heading of the craft, there being a selector switch operable in one position to energize said motor in correspondence with said third signal and in a second position to cause steering of the craft in correspondence with said third signal.

10. An autopilot system as recited in claim 2, including a demodulator responsive to a second harmonic component of said third signal to produce a DC voltage varying in accordance with the angularity between said coil means of the second resolver section and said resultant field, an amplifier energized by said DC voltage, a motor operable in a predetermined non-autopilot condition of said system to drive said second section of the resolver to a setting corresponding to the actual heading of the craft, and selector switch means operable in one position to energize said motor in correspondence with said third signal, and in a second position to cause steering of the craft in correspondence with said third signal.

11. An autopilot system as recited in claim 2, in which said flux gate coils of said first pair are identical though connected reversely; and said flux gate coils of said second pair are identical to the coils of said first pair though connected reversely and offset 90° from the first pair of coils; said core means including a ring of magnetic material about which all four of said flux gate coils are wound at locations offset 90° electrically; there being gimbal means mounting said core and said flux gate coils to said craft for maintenance by gravity in a predetermined horizontal condition, by retaining said ring and flux gate coils against rotation relative to the craft about a vertical axis; said power source being a common transformer having a primary coil energized by alternating current and a secondary coil connected at opposite ends to said end leads of both pairs of flux gate coils having said intermediate tap at the center of said secondary coil; said two coils of said one section of the resolver having first ends connected to said common leads of the two pairs of flux gate coils respectively and having second ends connected to said intermediate tap of the secondary coil of said transformer; there being a motor for driving said second section of the resolver rotatively to different settings, means operable in a predetermined non-autopilot condition of said system to energize said motor under the control of said third signal to drive said second section of the resolver to a setting corresponding to the actual heading of the craft, and selector switch means operable in one condition to energize said motor in correspondence with said third signal and in a second condition to cause steering of the craft by said steering means in correspondence with said third signal.

* * * * *